UNITED STATES PATENT OFFICE.

WASHINGTON F. DAVIS, OF NEW YORK, N. Y., ASSIGNOR TO B. CORNELL.

IMPROVEMENT IN PROCESSES FOR MAKING PAINTS.

Specification forming part of Letters Patent No. 9,208, dated August 17, 1852.

*To all whom it may concern:*

Be it known that I, WASHINGTON F. DAVIS, of the city, county, and State of New York, have invented a new composition to be used in combination with any and all kinds of material used for paints when mixed with oils or spirits of turpentine, or both, of which the following is a full, clear, and accurate description.

My invention consists in using with what are commonly called "oil" paints or "oil and turpentine" paints a strong watery solution of sulphate of zinc. This solution requires no particular prescription or formula for making, the sulphate of zinc being readily soluble in water, either warm or cold, though warm water dissolves it sooner. The quantity of sulphate of zinc I generally use is in the proportion of from one to three pounds of zinc to one gallon of water, though in some cases I have used six pounds of zinc to one gallon of water. The rule with me is to use the greater proportion of the sulphate of zinc to the gallon of water when the lighter or more bulky articles form the paints—as the ochers, Spanish brown, &c.—and to use the lesser quantity of the sulphate of zinc with the more weighty basis—as the lead and zinc paints. Of this watery solution of sulphate of zinc I use about half as much as the paints, by measure—that is, I add to the paints as ordinarily mixed and made up of raw linseed-oil, boiled oil, or turpentine, or of the oil and turpentine together, about one-half gallon to every gallon of the paint, varying the quantity to suit the weight and consistency of the paint, as also the work to be done, taking into consideration the wood or other substance to be painted and the number of coats I design to put on.

The great objects obtained by the use of this zinc solution mixed with paints are that the paint flows smoother and easier, that while I add a fluid to paint instead of thinning it, as would be supposed, in the proportion and under the restrictions I have named, the paint has its body and consistency increased, so that I am enabled at a much less expense to cover over the same, and in some cases a greater amount of wood or other surface than I could do with the ordinary paints, that a firmer and harder and more durable covering to the surface painted is produced, and in many cases a brighter, livelier, and more permanent color is the result. This effect of the mixtures is very evident in all bright colors, like green, red, yellow, and the various light shades of paints, brightness and clearness being very manifest. In addition, then, to the advantage of cheapness, I have by the use of this mixture a harder surface, brighter and more durable colors, and easier work. I am not prepared to explain the rationale of the effect of this mixture upon the paints. I am not a chemist. I only state facts derived from the use and experience in the mixture, and whether all the effects of this mixture on the paint and the useful results which follow are due to the astringency of the zinc or chemical changes produced between the zinc and the articles comprising the paints, or how much part the water itself performs, I am not able to say. One of the advantages of this composition renders it particularly applicable to the use of paints in printing or painting oil-cloths.

It will be observed by most individuals in unrolling a bundle of oil-cloth that the painted surface sticks, and sometimes adheres so firmly to the outer or under surface that a portion of the painted surface is much marred, and thus injured. The use of my composition with the paint or printing materials avoids this difficulty, as the surface becomes hard and has none of this sticky or adhesive character. It will be perceived that I produce results altogether different and beyond those that follow the use of watery solutions of gummy or resinous matters, having in view only the spreading out of the material over a greater surface, without in fact making a hard or durable covering or the use of zinc or other like articles in the oil and base or mineral which forms the paint, usually called "driers." I produce new and useful results which are not produced by the watery solution of gums and like articles, for, while they swell out the mass, they add nothing to the hardness of the substance.

Though the watery solutions of the sulphate of zinc is the principal salt I have used to mingle with paints, it is evident that sulphate of iron, sulphate of copper, acetate of lead, or nitrate of lead, and, indeed, any other styptic salt soluble in water might be used for mixing with the lead or other paints in place of the one preferred by me.

I am aware that various mixtures of gelatine, albumen, and gum-resins have been used in watery solutions for making a cheap paint that covers extensive surfaces; but such paints as the gums dry-crack and leave fissures in the surfaces so covered, and have other defects. I do not therefore claim the use of watery solutions with such materials; but

What I claim as my invention is—

The use of a watery solution of the sulphate of zinc to be mixed with white lead, zinc-white, or other oil-paints, in the manner herein set forth.

The above specification of my preparation of paint signed this 16th day of December, 1851.

WASHINGTON F. DAVIS.

Witnesses:
JOHN JOHNSON,
JOHN W. BROWN, Jr.